United States Patent [19]
Baker

[11] Patent Number: 5,330,039
[45] Date of Patent: Jul. 19, 1994

[54] CLUTCH WITH TORQUE MEASURING DEVICE

[75] Inventor: David J. Baker, Arbroath, Scotland

[73] Assignee: TI Matrix Engineering Limited, Angus, Scotland

[21] Appl. No.: 930,655

[22] PCT Filed: Apr. 2, 1991

[86] PCT No.: PCT/GB91/00509

§ 371 Date: Sep. 30, 1992

§ 102(e) Date: Sep. 30, 1992

[87] PCT Pub. No.: WO91/15684

PCT Pub. Date: Oct. 17, 1991

[30] Foreign Application Priority Data

Apr. 2, 1990 [GB] United Kingdom .............. 9007350.3

[51] Int. Cl.[5] ...................... F16D 25/14; F16D 27/16
[52] U.S. Cl. .................................... 192/30 W; 192/54; 192/56 R; 192/56 F; 192/84 C; 192/85 CA
[58] Field of Search ..................... 192/30 W, 54, 56 R, 192/56 F, 84 C, 85 CA

[56] References Cited

U.S. PATENT DOCUMENTS 3,400,795 9/1968 Miller ................................. 192/56 R
3,717,029 2/1973 Tveter .
3,797,305 3/1974 Haskell .
3,917,042 11/1975 Summa .
4,186,596 2/1980 Bohringer et al. .
4,293,060 10/1981 Miller ................................. 192/56 R
4,624,356 11/1986 Hanks et al. .
4,662,492 5/1987 Troeder .
4,903,804 2/1990 Beccaris et al. .

FOREIGN PATENT DOCUMENTS 2636086 2/1978 Fed. Rep. of Germany .
1-220726 9/1989 Japan ................................. 192/84 C
2202441 11/1979 United Kingdom .
2155565 9/1985 United Kingdom .............. 192/84 C

*Primary Examiner*—Richard M. Lorence
*Attorney, Agent, or Firm*—Seidel, Gonda, Lavorgna & Monaco

[57] ABSTRACT

In fluid pressure or electromagnetically operated clutches, the transmitted torque is measured by strain gauges incorporated in rotating clutch members. The strain gauges are energized and the signal from them conveyed to stationary control equipment by way of co-operating rotating and fixed coils of which one, in the case of the electromagnetically actuated clutch, can be energized to operate the clutch.

25 Claims, 2 Drawing Sheets

CLUTCH WITH TORQUE MEASURING DEVICE

DESCRIPTION

The invention relates to the measurement of torque transmitted by a rotating member.

The application is concerned with the measurement of torque transmitted by a clutch element in a clutch of the kind comprising a drive member for receiving a rotational drive, and a clutch element which is axially movable between a first position in which the rotational drive is applied by way of the clutch element to a driven member and a second position in which the drive is not so applied. Such clutches are widely used in industrial machinery and it would be advantageous in many applications to be able to measure the torque being transmitted through the clutch during operation, as for monitoring the performance of the machines in which they are incorporated and for control purposes, for example, to prevent overloading.

In accordance with the invention, a clutch of the kind described above is characterised by transducer means responsive to the torque transmitted in the clutch in the first position of the clutch element to provide an output signal to first electrical coupling means, the first electrical coupling means co-operating with second electrical coupling means carried by a stationary portion of the clutch to convey the output signal to a stationary electrical treatment means.

By the use of the coupling means operating between the torque transmitting member and a stationary member, the former need carry only the transducer or sensor means and the first coupling member. The coupling means can operate inductively, and can comprise a first and second electromagnetic coil located on respective adjacent surfaces of the transmitting member and the stationary member. The coupling means can convey any power needed to energise the transducer or sensor means from the stationary units, as well as conveying the torque dependent output to it. The stationary unit can be located remotely from the torque transmitting member so as to be shielded from vibration and oil splash for example when the member is incorporated in a brake or clutch mechanism. The stationary unit can employ the torque dependent output for recording and/or display and/or control purposes. The output supplied to the stationary unit can be the raw transducer output, but this can be processed by miniaturised processing means carried by the torque transmitting member.

Thus, in a clutch comprising a rotatable driving member, a rotatable member to be driven, and a clutch element selectively movable element between operative and inoperative positions in which it respectively transmits and does not transmit a drive from the driving member to the driven member, there can be provided in accordance with the invention, a transducer means in the form of strain gauge means incorporated in the clutch element, so as to respond to the torque transmitted thereby, and a transformer coupled tuned oscillator, for transmitting power to energizing the strain gauge means and for transmitting the strain gauge means output from the clutch. The primary and secondary windings of the coupling transformer are preferably located on respective opposed faces of the clutch element and of a stationary clutch portion having a spacing between them which remains at least approximately constant during operation.

The strain gauge or other sensor means output can be employed for measurement purposes, for example, to provide a measure of actual torque transmission either continuous or when required. The output can be recorded if desired, and can instead or in addition be applied to a microprocessor capable of treating the output so as to provide a desired function. Thus, in a clutch, the microprocessor could be arranged to store a normal operating torque level, either selectively input or generated from past clutch experience, and to give an indication of any departure therefrom exceeding the predetermined level, and/or to activate an alarm and/or to disengage the clutch to prevent overload damage. The invention can thus be embodied to function as a torque limiter, and, in a brake mechanism, to apply torque between predetermined maximum and minimum levels.

In a friction clutch, the processor could operate to cushion shock loads by momentary disengagement followed by re-engagement, so that machine acceleration could be controlled.

In a fluid-pressure operated clutch, the operating pressure could be controlled in response to the torque sensor output to a level appropriate to the actual torque being transmitted. The working life of the bearings of the clutch could thus be extended because maximum pressures would be applied only when needed. The controller or microprocessor could include suitable memory for recording the hours of operation of the clutch, if desired, to assist servicing.

The invention is further described below, by way of example, with reference to the accompanying drawings, in which.

Figure 1:
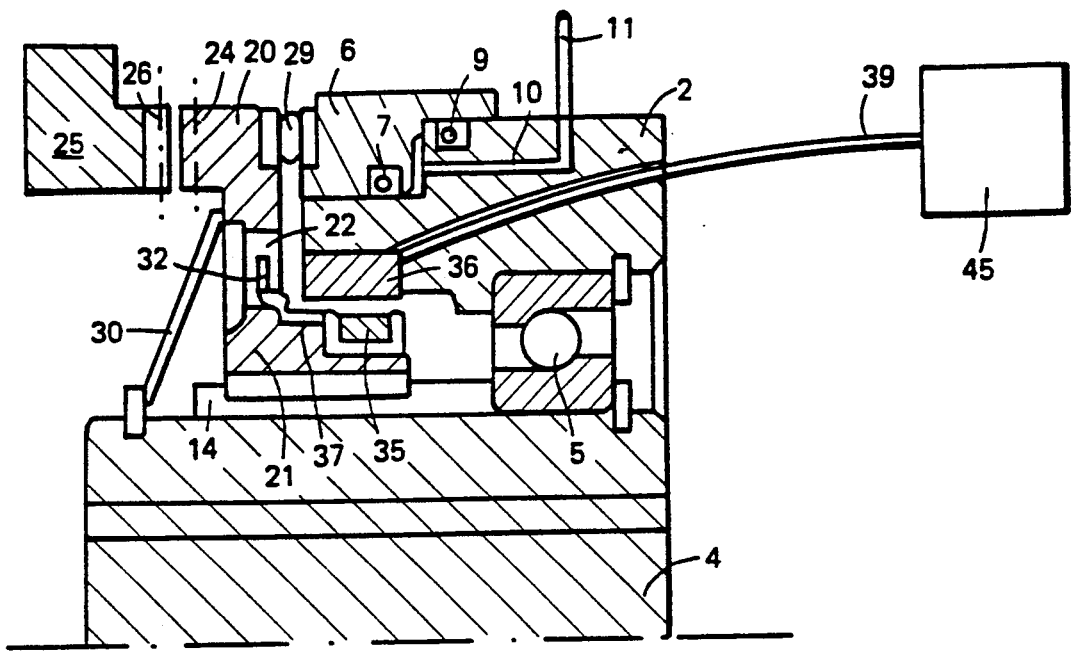
FIG. 1 is a schematic sectional side view of a fluid pressure operated toothed clutch embodying the present invention.
Figure 2:
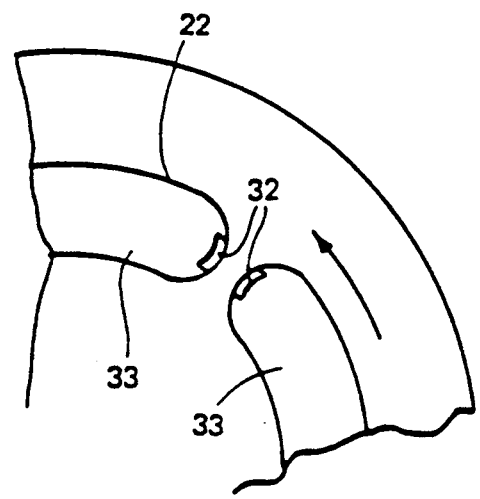
FIG. 2 is a fragmentary axial view on a larger scale of a part of the clutch of FIG. 1.

The clutch illustrated in FIGS. 1 and 2 comprises a fixed housing or support of which only a support member 2 of annular form is shown in the drawings. A drive shaft 4 coaxially journalled within the support member 2 by a bearing 5 can be rotatably driven by a motor (not shown).

The support member 2 is externally stepped at what will be referred to as the forward end and a drive ring 6 is received externally around the reduced diameter portion forward of the step. The drive ring 6 contains within a peripheral groove a seal element 7 engaging with the reduced diameter portion of the support member 2. The drive ring 6 also has a sleeve portion projecting rearwardly over the larger diameter portion of the support member 2 for sealing engagement with a seal element 9 received within a peripheral groove of the support member.

The end face of the drive ring 6 adjacent the support member step is recessed and a passage 10 extends from the exterior surface of the support member to the chamber formed by the recess and the step. The passage 10 communicates by way of tubing 11 with a fluid pressure source 12 from which a pressure fluid, for example, air or an hydraulic fluid, can be supplied through the tubing and the passage to the chamber, to cause the drive ring 6 to move on the support member 2 away from the step.

The drive shaft 4 has longitudinally extending splines 14 and an annular clutch element 20 surrounding the shaft has grooves formed in its inner surface receiving the splines, so that the clutch element is rotatably driven by the shaft and is capable of movement axially along it. The clutch element 20 has around the grooves an inner portion 21 received in the annular space between the support ring 2 and the drive shaft 4 and an intermediate portion 22 extending radially outwardly from the forward end of the inner portion.

The clutch element 20 also has an outer portion radially adjacent the drive ring 6 and having an annular array of forwardly extending radially directed clutch teeth 24. A driven clutch member 25 has an annular array of radially directed teeth 26 for co-operation with the teeth 24.

A further bearing 29 is provided between the outer portion of the clutch element 20, opposite the teeth 24, and the non-rotating drive ring 6 to accommodate the relative rotation of these parts and transmit the fluid pressure generated thrust of the drive ring to the clutch element.

In the position shown in FIG. 1, the teeth 24, 26 are spaced slightly apart, so the clutch is disengaged, with the clutch element 20 rotating freely with the drive shaft 4. Engagement is affected by application of fluid pressure through the passage 10 to causes the drive ring 6 to move axially to the left as shown, and to push the clutch element 20 in the same direction by forces transmitted through the bearing 29, until the two sets of teeth are engaged together. Torque is then supplied from the drive shaft 4 through the clutch element 20 to the driven member 25. A spring 30 acting between the shaft 4 and the clutch element 20 is loaded by this movement of the clutch element.

When the clutch is to be disengaged, the fluid pressure is released, and the spring 30 effects positive return of the clutch element 20 to the position shown in which the teeth 24, 26 are spaced from engagement.

The torque transmitted from the drive shaft 4 to the driven member 25 is measured in accordance with the invention by sensor means located in the clutch element and constituted by a strain gauge bridge which can be a temperature compensating bridge if required. The strain gauges 32 of the bridge are accommodated within kidney-shaped slots 33 formed in the intermediate portion 22 of the clutch element 20.

Electrical communication between the strain gauge sensor means, which of course rotates in use, and stationary equipment carried by the fixed housing or support, or remotely located, is effected electro-magnetically by co-operating coil means 35,36 set into opposed recesses at the outer surface of the clutch element inner portion 21 and at the inner surface of the reduced diameter portion of the support member 2. The stationary coil primary means 36 on the support member 2 has a greater axial length than the secondary coil means 35 on the clutch element 20 so that the coils are inductively coupled whatever the axial position of the clutch element 20. Leads 37 extend between the strain gauges 32 and the coil means 35, and leads 39 extend from the coil means 36 to the stationary treatment or receiver equipment. This equipment can comprise means for displaying and/or recording an indication of the torque being transmitted and/or means for exercising a desired control function.

Figure 3:
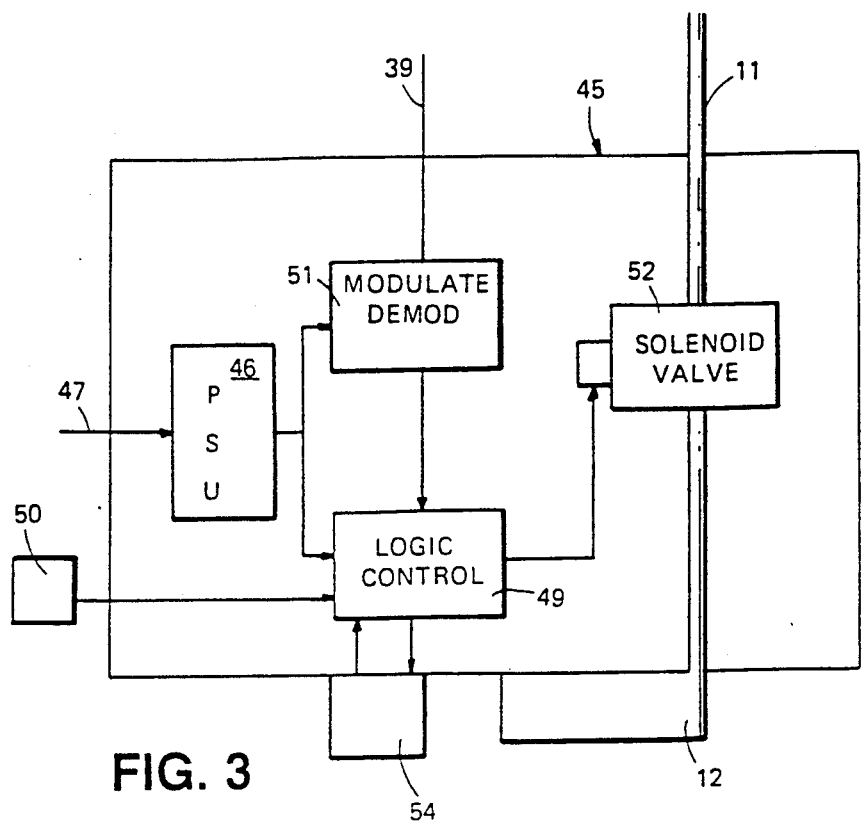
FIG. 3 is a block diagram illustrating electrical control arrangements for the clutch of FIG. 1.

The equipment can conveniently comprise a control unit such as the unit 45 illustrated schematically in FIG. 3.

The control unit 45 comprises a power supply unit 46 receiving a mains power supply on a line 47 and control logic 49 responsive to an on/off control 50, which may be remotely located. The power supply unit 46 also energizes the strain gauge bridge by way of the leads 39 and coils 35,36. As these components carry the strain gauge output also, the leads 39 connect to a modulator/de-modulator unit 51 incorporated in the control unit, through which the strain gauge bridge is energized and from which the strain gauge output is supplied to the control logic 49.

A solenoid valve 52 operative in the supply line 11 between the fluid pressure source 12 and the passage 10 is responsive to an output from the control logic and may be incorporated in the control unit 45. The control logic 49 is arranged to exercise a suitable control function, for example, as described above, as it may respond to the strain gauge output so as to cause the solenoid valve 52 to cut off the fluid pressure supply to the clutch if the torque transmitted by the clutch element 20 exceeds a predetermined value or range of values, which may be preset into a memory of the control logic, or may be established by the control logic in consequence of previous clutch experience.

The control unit 45 also includes a communications interface 54 allowing the value within the logic 49 of the torque being supplied through the clutch to be displayed and/or recorded externally and/or remotely of the unit 45. The clutch performance can thus be monitored. The interface 54 also allows access to the control logic to permit selective adjustment of the control function, for example, of the predetermined level. The sensitivity of the clutch can thus be altered, remotely if required, and during operation, as when there is a greater risk of overloading.

The clutch illustrated in FIG. 4 again comprises a fixed housing or support including an annular support member 60 with a drive member 61 coaxially journalled within it, by bearings 62. The support member 60 has an annular recess open to the left as shown in which is received a stationary coil 64. The drive member 61 has an external flange 65 axially adjacent the coil 64 and which functions as a clutch element, being provided with clutch teeth 66 extending axially away from the coil 64 at its outer edge.

A driven member 70 is journalled on the drive member 61 by bearings 71 and carries a movable annular clutch element 72 at a transverse face opposite the flange 65. The clutch element 72 is carried by the member 70 on axially projecting bolts 74 for axial movement towards and away from the flange 65. The bolts 74 extend from the driven member 70 into recesses in the element 72 opening from the face opposite the flange 65. Compression springs 75 received on the bolts 74 between their heads and the floors of the recesses act to urge the element 72 against the driven member 70. A ring of clutch teeth 76 is provided at the outer periphery of the element 72 for engagement with the teeth 66.

Figure 4:
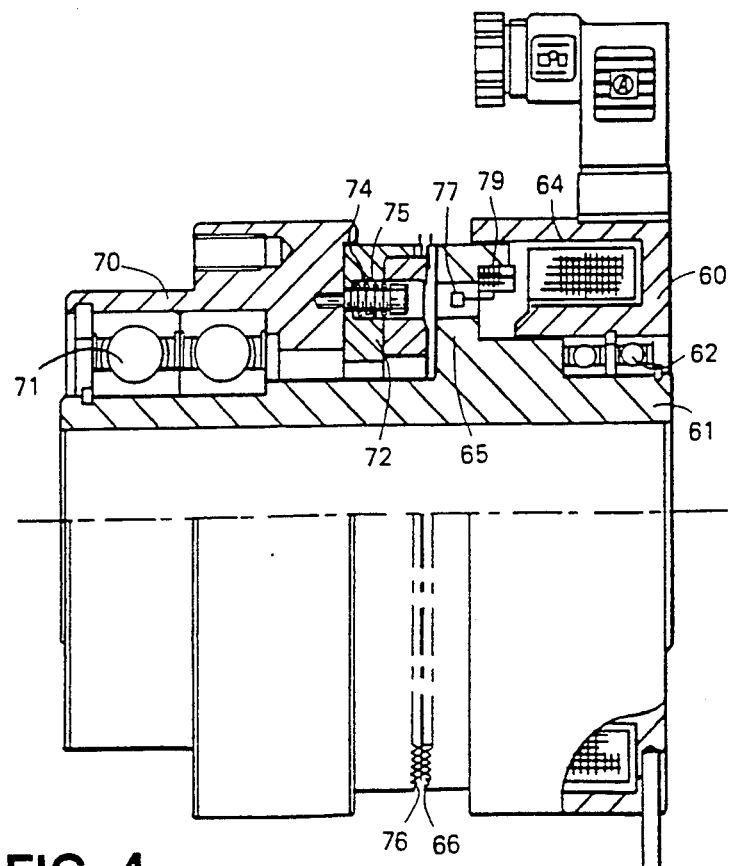
FIG. 4 is a view similar to that of FIG. 1 of an electromagnetically operated toothed clutch embodying the invention.

In the position shown in FIG. 4, the teeth 66,76 are spaced slightly apart, so the clutch is disengaged, with the driven member 70 free on the drive member 61. Engagement is effected by energization of the coil 64 so as to move the clutch element 72 to the right as shown, compressing the springs 75, until the two sets of teeth are engaged together. Torque is then supplied from the drive member 61 through the clutch element 72 to the driven member 70.

When the clutch is to be disengaged, the coil 64 is de-energized and the springs 75 effect positive return of the clutch element 72 to the position shown in which the teeth 66,76 are spaced apart.

The torque transmitted is measured by sensor means, located in the flange 65, which can again be constituted by a strain gauge bridge, temperature compensated if required. The strain gauges 77 of the bridge can be accommodated in the flange in the same way as the gauges 32 are accommodated in the clutch element 20.

Electrical communication between the rotating strain gauge sensor means and stationary equipment is effected electro-magnetically by way of a coil 79 set into a recess in the flange 65 so as to co-operate with the coil 64. The coil 64 thus functions similarly to the fixed coil 36 of FIG. 1 but in addition serves to effect engagement of the clutch. The stationary equipment to which the coil 64 is connected can comprise means for displaying and/or recording an indication of the torque being transmitted and/or means for receiving or exercising a desired control function. The equipment can thus correspond to the unit 45 modified to exercise control of the clutch position by energization or de-energization of the coil 64 instead of by operation of the solenoid valve 52.

The invention can be embodied in a variety of ways other than as specifically described and illustrated.

I claim:

1. A clutch device comprising:
   a frame,
   a drive member for receiving a rotational drive,
   a drivable member,
   a clutch element,
   electromagnetic coil means for moving said clutch element between a first position in which said rotational drive is applied by way of said clutch element to said drivable member and a second position in which said drive is not so applied,
   transducer means responsive to the torque transmitted in said clutch in said first position of said clutch element to provide an output signal,
   electrical treatment means for treating said output signal,
   first electrical coupling means receiving said output signal, and
   second electrical coupling means carried by said clutch frame,
   said first electrical coupling means co-operating with second electrical coupling means to convey said output signal to said electrical treatment means and said electromagnetic coil means for moving said clutch functioning also as said second electrical coupling means.

2. The device of claim 1 wherein said transducer means is located on said clutch element and wherein the first and second electrical coupling means are located respectively on said clutch element and on said frame in concentric relationship.

3. The device of claim 1 wherein said transducer means is located on said drive member and wherein said first and second electrical coupling means are located respectively on said drive member and said frame in axially opposed relationship.

4. The device of claim 1 wherein said first and second electrical coupling means comprises inductively coupled electromagnetic coils.

5. The device of claim 1 wherein said transducer means requires to be electrically energized, and wherein electrical energization of said transducer means is effected by way of said first and second electrical coupling means.

6. The device of claim 1 wherein said transducer means comprises at least one strain gauge.

7. The device of claim 1 wherein said electrical treatment means is adapted to display and/or record said transmitted torque as measured by said transducer means.

8. The device of claim 1 wherein said electrical treatment means is adapted to sense departure of said transmitted torque as measured by the transducer means from at least one of a predetermined value and a predetermined range of values, and to indicate such a departure and/or to exercise a control function in response to the sensing of such a departure.

9. The device of claim 8 further comprising means for selective adjustment of said predetermined value and/or the predetermined range.

10. The device of claim 8 wherein said electrical treatment means includes means whereby said predetermined value and/or the predetermined range are adjusted in response to clutch experience.

11. The device of claim 8 wherein said control function comprises disengagement of said clutch either momentarily or until reset.

12. A clutch device comprising:
    a support frame,
    a rotary drive member journaled in said support frame,
    a drivable clutch member journaled in said frame,
    a clutch element carried by said rotary drive member for rotation therewith and for movement along the axis of said rotation between a first position in which said clutch element couples said rotary drive member to said drivable clutch member and a second position in which said rotary drive member is decoupled from said drivable clutch member,
    clutch control means selectively operable to move said clutch element between said first and second positions thereof,
    transducer means mounted on said clutch element, said transducer means being adapted to provide an output signal dependent on torque transmitted by said clutch element in said first position thereof,
    electrical treatment means carried by said frame, and
    electrical transmission means transmitting said output signal to said electrical treatment means, said electrical transmission comprising co-operating first and second non-contacting members carried respectively by said clutch element and said frame.

13. The clutch device of claim 12 wherein said clutch element comprises an inner portion adapted to engage said rotary drive shaft, an outer portion at which said clutch element is adapted to engage said drivable clutch member in said first position of said clutch element, and an intermediate portion between said inner and outer portions, said transducer means being mounted on said clutch element at said intermediate portion thereof.

14. The device of claim 12 wherein said clutch control means comprises fluid-pressure-operated means.

15. The device of claim 12 wherein said first and second non-contacting members comprise first and second electromagnetic coils and wherein said second electromagnetic coil is additionally comprised within said clutch control means.

16. The device of claim 12 wherein said electrical treatment means is adapted to sense departure of said transmitted torque as measured by said output signal from one of a predetermined value and a predetermined range of values, and to indicate said sensed departure.

17. The device of claim 16 wherein said electrical treatment means is adapted to exercise a control function in response to the sensing of said departure, said control function comprising movement of said clutch element to said second position thereof.

18. A clutch device comprising:
a support frame,
a drive member journaled in said support frame for rotation about an axis,
a drivable member rotatable about said axis,
a clutch member rotatable about said axis, said clutch member and one of said drive member and said drivable member having co-operating interengageable annular clutch formations centered on said axis, said clutch member being attached to the other one of said drive member and said drivable member, said clutch member being movable along said axis between a first position in which said clutch formations are interengaged whereby said clutch member couples said drive member to said drivable member and a second position in which said clutch formations are disengaged whereby said drive member is decoupled from said drivable member,
control means selectively operable to move said clutch member between said first and second positions thereof,
transducer means mounted on one of said clutch member and the one of said drive member and said drivable member having said clutch formation, said transducer means being located at a position radially between said axis and said clutch formations, and said transducer means being adapted to provide an output signal dependent on torque transmitted through said clutch device in said first position of said clutch member,
electrical treatment means responsive to said output signal, and
electrical transmission means transmitting said output signal to said electrical treatment means, said electrical transmission comprising co-operating first and second non-contacting members carried respectively by said support frame and by said one of said clutch member and said drive member and said drivable member having said transducer means mounted thereon.

19. The device of claim 18 wherein said clutch member is mounted on said drivable member, said drivable member having said clutch formation.

20. The device of claim 19 wherein said drivable member is journaled on said drive member.

21. The device of claim 18 wherein said clutch member is mounted on said drive member, said drivable member having said clutch formation.

22. The device of claim 18 wherein said control means comprises an electromagnetic coil mounted on said frame and means for selectively energizing said coil, and wherein said electromagnetic coil is adapted to function also as said second non-contacting member.

23. The device of claim 18 wherein said transducer means comprises at least one strain gauge.

24. The device of claim 18 wherein said electrical treatment means is adapted to sense departure of said transmitted torque as represented by said output signal from at least one of a predetermined value and a predetermined range of values.

25. The device of claim 24 wherein said electrical treatment means includes means whereby at least one of said predetermined value and said predetermined range of values is adjusted in response to clutch experience.

* * * * *